LINEAR SELECT DEVICE

Filed Feb. 23, 1966 3 Sheets-Sheet 1

INVENTORS
RICHARD P. SHIVELY
DAVID V. DICKEY
BY
Ernest L. Brown
ATTORNEY

LINEAR SELECT DEVICE

INVENTORS
RICHARD P. SHIVELY
DAVID V. DICKEY
BY
Ernest L. Brown
ATTORNEY

FIG. 8
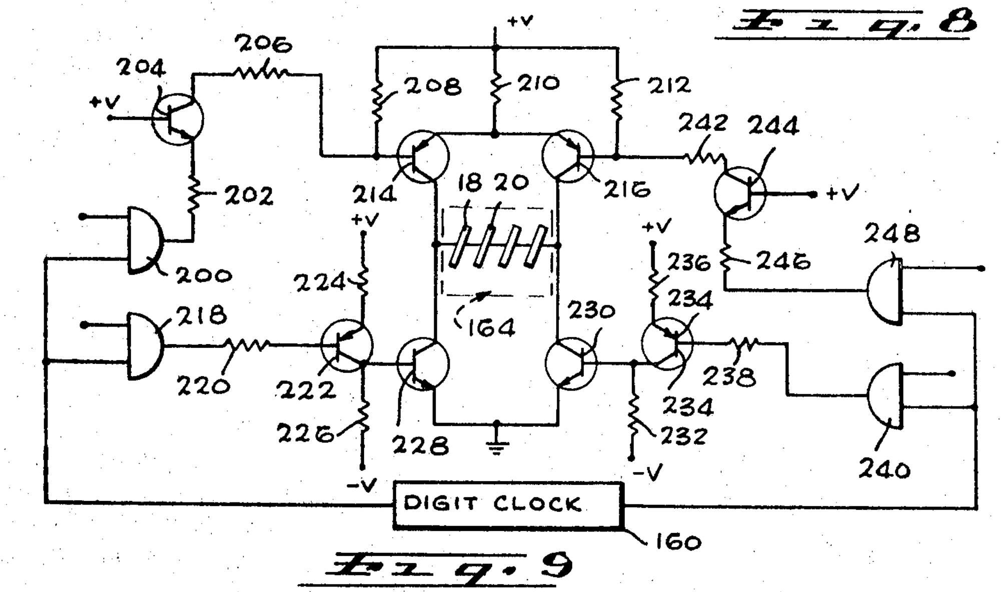
FIG. 9
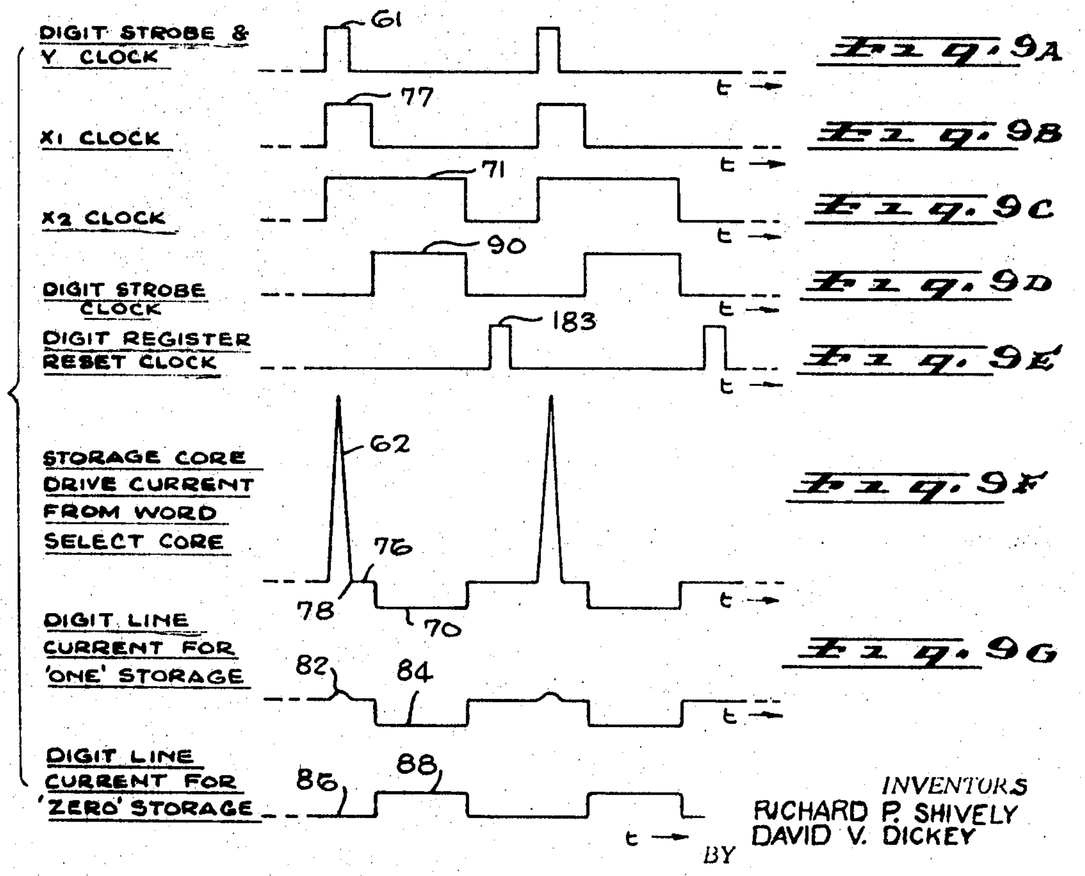
FIG. 9A FIG. 9B FIG. 9C FIG. 9D FIG. 9E FIG. 9F FIG. 9G
FIG. 9H
INVENTORS
RICHARD P. SHIVELY
DAVID V. DICKEY
BY
Ernest L. Brown
ATTORNEY United States Patent Office 3,469,246
Patented Sept. 23, 1969

3,469,246

LINEAR SELECT DEVICE

Richard P. Shively and David V. Dickey, Los Angeles, Calif., assignors to Litton Systems, Inc., Beverly Hills, Calif., a corporation of Maryland Filed Feb. 23, 1966, Ser. No. 529,319
Int. Cl. G11b *5/00*
U.S. Cl. 340—174 24 Claims

ABSTRACT OF THE DISCLOSURE

A memory device comprising a storage core matrix and a core selection matrix. Switching means are provided for cyclically switching selected ferromagnetic switching cores from a first to a second and then back to a first remanent state so that the speed of said former transition, timed to coincide with a read mode of operation, is substantially greater than that of the latter transition, timed to coincide with a write mode. The transitional rates are selected to apply different desired magnitudes of magnetomotive force to the selected storage cores in the read-write modes, and these desired transitional rates are obtained by reducing the magnetomotive force in steps during the transition period from the second, back to the first remanent state.

This invention pertains to a linear select magnetic memory means. More particularly, this invention pertains to a means for energizing the word select magnetic cores of a linear select memory.

In prior known linear select devices, as represented by United States Patent No. 2,734,184, entitled: "Magnetic Switching Devices," dated Feb. 7, 1956, to J. A. Rajchman, are relatively slow in operation. Attempts to increase their speed by increasing the driving current tend to make them more temperature sensitive, and the noise content of the output signals is relatively high.

A good description of typical linear selection memories is found in Chapter 24 of "Digital Applications of Magnetic Devices," edited by Albert J. Meyerhoff, et al., published by John Wiley and Sons, Inc. in 1960.

The linear selection memory device which is the subject of this invention is, in a preferred embodiment, of the type in which an entire word of memory is read at one time. Typically each word of storage has the same number of storage cores, although it is within the scope of the invention to use words having different numbers of bits or in which the particular bits may be missing from a predetermined word. A digit line is provided and assigned to a particular bit. Each digit line threads all of the storage cores corresponding to a particular order bit. The digit line is used to sense the storage condition of the cores and to transmit inhibiting current or enhancing current when information is being written into the memory.

All of the memory cores associated with a particular word of storage are threaded with a common conductor which is coupled to a word-select magnetic core assigned to that particular word.

The word-select cores customarily are arranged in a two or three dimensional matrix. A common bias conductor threads all of the word-select cores. Each row of the word-select cores has a common conductor threading therethrough. Each column of the word-select cores has a common conductor threading therethrough. In a three dimensional matrix of word-select cores each stack in a third dimension also has a common conductor threading therethrough. Thus, in a two dimensional matrix each core has three conductors threading therethrough, and in a three dimensional matrix each core has four conductors threading therethrough. It is not essential that the word-select cores be arranged in matrix form, but this is the more common configuration.

The ferromagnetic cores which are used both for the storage cores and for the word-select cores preferably have a very steep, or square, hysteresis loop. Such a core has two remanent magnetic states, corresponding in a predetermined fashion, to the "1" and "0" of a binary number system. In the storage cores, when the switching threshold magnetomotive force is exceeded, particularly with a steep hysteresis curve, the flux in the core changes rapidly which induces a voltage into the digit line of that core. That voltage must feed into a sufficiently high impedance so that a current of sufficient amplitude to change the remanent states of the other storage cores on that digit line is not produced. Typically, to read the information stored in the storage cores of a given word, a current is applied from the word-select core to all of the storage cores in that storage word with a sense and magnitude sufficient to drive all of the storage cores in that word into their remanent states corresponding to a storage of a "0." If a particular storage core is already storing a "0," the application of a magnetomotive force to drive said storage core into the remanent state corresponding to a "0" does not generate a significant flux change and substantially no voltage is produced on the digit lines threading that core. However, if a particular storage core is in its remanent state corresponding to a "1," the application of a magnetomotive force tending to drive said core into the remanent state corresponding to a "0" causes a significant change in flux which generates a voltage in the digit line threading that core, thereby signifying that a "1" had been stored.

The reading out of the storage cores associated with a particular word destroys the information stored in those storage cores because it drives all of the cores into a remanent state corresponding to a stored "0." Therefore, if it is desired not to destroy the information, it must be rentered or restored into the storage cores. To that end, typically a series of bi-stable multivibrators of flip-flops are connected to be controlled by the readout signal on the digit line. The outputs of the flip-flops are then used to control a current driver connected to drive current into the digit line in one direction or the other to enhance the resetting of the storage core into a remanent state corresponding to a "1" or to inhibit or oppose that resetting. The amplitude of the inhibiting or enhancing current in the digit line may not exceed a predetermined value or it will change the remanent state of other cores connected to that particular digit line. That is, the magnitude of inhibiting or enhancing current in the digit line must not be sufficient, by itself, to change the remanent state of the storage cores which it threads. However, with the magnetomotive force generated by current in the digit line, in combination with the magnetomotive force generated by current delivered by the word-select core, the storage core may be reset into a remanent state corresponding to a "1" or maintained in a remanent state corresponding to a "0." It is apparent, therefore, that since the current amplitude in the digit line is limited, that if the magnetomotive force generated by that current is to be sufficient to inhibit or overcome the magnetomotive force generated by current delivered from the word-select core, the current delivered by tthe word-select core must also be limited in amplitude during thte reset portion of the computer cycle.

During the readout of the storage cores, it is desirable to generate a readily identifiable signal which stands out above the noise. It is also extremely desirable to make the signal very short in order to reduce the overall cycle time of reading out and reentering information into the storage cores. Thus, it is desirable to drive a current from the word-select cores through the storage cores at a high amplitude to cause the maximum magnetomotive force applied to the storage cores during the read portion of the cycle to be very high. The providing of a very high maximum magnetomotive force causes the storage cores to change remanent state very rapidly and to generate a short, intense, voltage pulse during the read portion of the cycle. During the reentry portion of the cycle, the current delivered by the word-select core is limited because it cannot be allowed to overpower the inhibiting current delivered on the digit line.

In order for the word-select core to deliver a spike of current to the storage cores during the read portion of the cycle and to deliver a limited amplitude current during the reentry portion of the cycle, it is desirable to cause the maximum magnetomotive force applied to the word-select core during the read portion of the computer cycle to be very large while the maximum magnetomotive force of the opposite polarity applied during the reentry portion of the computer cycle is limited. The magnitude of the maximum magnetomotive force during the reentry portion of the computer cycle depends upon how rapidly it is desired to change the flux in the word-select core. The speed of change of flux in the word-select core is limited by the maximum allowable current to be delivered to the storage cores by the word-select core during the reentry portion of the cycle, which must not be sufficiently large to overwhelm the inhibiting current in the digit line.

In the prior art, the word-select cores are biased to cause the maximum magnetomotive force during the reentry portion of the cycle to be equal to the magnetomotive force generated by the bias current. Thus, the magnetomotive force due to the bias current is near the instep of the hysteresis loop. Each of the non-bias currents threading the word-select core generates magnetomotive force opposing the magnetomotive force of the bias current. The magnitude of each of the non-bias currents is limited by the requirement that the algebraic sum of the magnetomotive forces, in the absence of one of the magnetomotive forces, must not exceed the switching threshold magnetomotive force. However, when all of the currents threading a particular word-select core are in coincidence, the algebraic sum of the magnetomotive force is such that the remanent state of the word-select core is changed. Further, in the prior art, all of the non-bias magnetomotive forces are simultaneously removed during the reentry portion of the computer cycle to cause the remanent state of the word-select core to return to its original remanent state which is defined by the magnetomotive force generated by the bias current. Thus, the magnitude of the bias current and magnetomotive force is seriously limited by the requirement that the inhibiting current in the storage cores is not to be overridden, and the speed of reading is limited by the limitation on the amplitude of the various coincident currents which thread the word-select cores and the requirement that the remanent state must not be changed except during coincidence of all of the predetermined number of magnetomotive forces.

Still another limitation upon the amplitude of the various coincident magnetomotive forces is that the switching threshold magnetomotive force decreases as the temperature increases and, within the range of temperatures expected, the algebraic sum of the magnetomotive forces applied, in the absence of a coincidence of all the magnetomotive forces, must not exceed the switching threshold magnetomotive force.

The device contemplated by this invention uses a very large biasing magnetomotive force, for example, four or more times the coercive magnetomotive force. The exact value of the biasing magnetomotive force is not critical, but may be as high as desired and is only limited by the noise signals which are generated by changes in flux due to the presence of part of the non-biasing magnetomotive force, i.e., during a so-called "half-select" condition. The non-bias magnetomotive forces may each be very large, and are only limited by the requirement that the alegbraic sum of all of the magnetomotive forces, except one of the non-bias magnetomotive forces, does not exceed the switching threshold magnetomotive force, i.e. that coincidence of all of the magnetomotive forces except one does not change the remanent state of the word-select core. The coincidence of all of the magnetomotive forces in the word-select core causes the maximum magnetomotive force to be very large, thereby causing a rapid change in flux which generates a spike of current to be delivered into the storage cores of that particular word to which the word-select core is coupled. Thus, in the device of this invention, a very short, very intense current pulse is delivered to the storage cores during the read portion of the computer cycle.

In the device of this invention, during the reentry portion of the computer cycle, not all of the non-bias magnetomotive force is removed. Only enough of the non-bias magnetomotive force is removed to cause the remanent state of the word-select core to return to its original remanent state with a speed of flux change which is limited by the magnitude of allowable current to be delivered to the storage cores. After the storage cores are reset, the remaining non-bias magnetomotive force is removed.

Because the digit line of the storage cores must be changed from a read line to a current driving line when a read cycle is replaced by a restore or reentry portion of the computer cycle, a small time delay between the read and reentry portions of the cycle is preferably scheduled into the circuitry to allow, for example, the above mentioned flip-flops which are attached to the inhibiting and enhancing current drivers to be switched.

It is therefore an object of this invention to improve the operation of magnetic word-select switches of the type described.

It is a further object of the invention to provide a linear-select core memory in which the speed of operation is increased.

It is another object of this invention to shorten the read time of a linear-select core memory.

It is also an object of this invention to operate a linear-select core memory using word-select cores in which a bias magnetomotive force is substantially greater in amplitude than the magnetomotive force needed to generate a memory reset current.

It is a more particular object of this invention to use a bias magnetomotive force on a magnetic word-select core in which the magnetomotive force applied to the core during reentry of storage bits is substantially less than said bias magnetomotive force, and in which the non-bias magnetomotive forces on said word-select core are removed in at least two time-separated steps.

It is a more specific object of this invention to provide apparatus to achieve the above enumerated objects.

Other objects will become apparent from the following description, taken in connection with the accompanying drawings, in which:

FIGURE 8 is a schematic diagram of a typical digit driver, connected to storage cores, as used typically in this invention; and FIGURE 9 is a series of graphs of currents and voltages, used to explain the invention.

Figure 1:
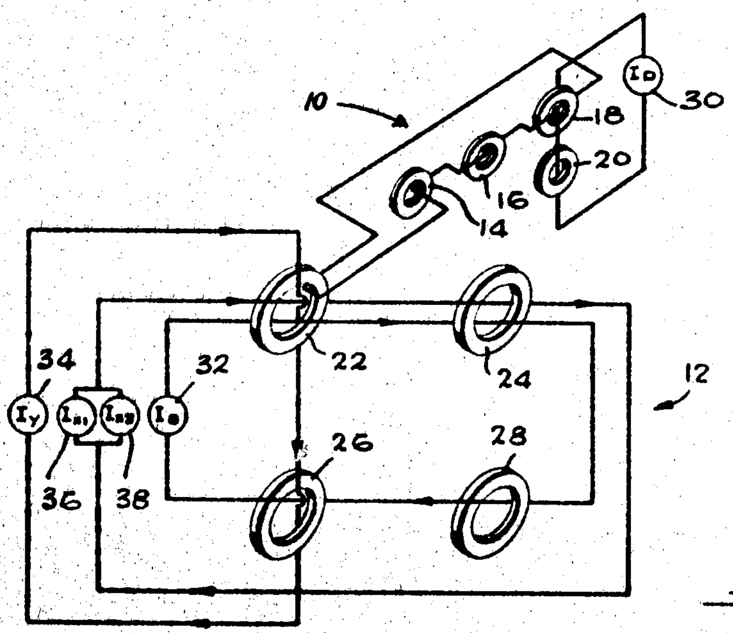
FIGURE 1 is a schematic diagram exemplary of a typical linear-select core memory, connected in accordance with this invention.

Referring to FIGURE 1, a plurality of ferromagnetic storage cores 10 are adapted to be controlled by a plurality of ferromagnetic word-select cores 12. The storage cores 10 are arranged in sets, each corresponding to a word of storage. The storage cores 10 are also arranged in sets, each corresponding to a particular bit within all of the stored words.

The word-select cores are each associated with a different word-set of storage cores. There is no required pattern for the word-select cores. However, it is customary to arrange the word-select cores into a two dimensional or three dimensional matrix. A two dimensional matrix is divided into sets corresponding to rows of the word-select cores and to sets corresponding to columns of the word-select cores. A three dimensional matrix of word-select cores are divided into sets corresponding to rows of cores, sets corresponding to columns of cores, and sets corresponding to stacks of cores. This invention will be described in detail using a two dimensional matrix of word-select cores. Other configurations will be described briefly.

Cores 14, 16 and 18 are shown to demonstrate a set of storage cores representing a word of storage. It is to be noted that a word of storage usually includes many bits, e.g. 20 bits. However, the storage cores 14, 16 and 18 are exemplary only and are intended to demonstrate the structure and method of operation of the invention.

The sets of storage cores corresponding to a particular numbered bit in all of the words of storage are represented by storage cores 18 and 20. There actually may be many hundreds or thousands of words of storage in the memory and if, for example, cores 18 and 20 correspond to bit number 3, the complete set would include all storage cores corresponding to bit number 3 in all of the words of storage.

The word-select cores 12 are shown with only four word-select cores 22, 24, 26 and 28. There are as many word-select cores as there are words of storage in the storage cores. For simplicity, only four word-select cores have been shown in a two dimensional matrix. The cores 22 and 24 form a row set of word-select cores. Similarly the cores 26 and 28 form a row set of word-select cores. The cores 22 and 26 form a column set of word-select cores. Similarily the cores 24 and 28 form a column set of word-select cores. In practice, there would be many more than two cores in a given set.

A digit driver and sensor 30 is connected to thread all of the storage cores in a given bit-set. That is, the shown sensing and driving member 30 is connected to conductors which thread storage cores 18, 20 and all other cores corresponding to that particular bit. In a similar fashion, other digit sensing and driving members (not shown) each are connected to a different set of conductors which thread a different bit-set. For example, another digit sensor and driver would be connected to conductors which would thread storage core 16 and, if storage core 16 corresponded to bit number 2, would also thread all other cores corresponding to bit number 2 in the other words of storage cores.

Each of the word-select cores is coupled to a closed conducting loop which threads all of the storage cores corresponding to a given word of storage. Storage core 22 is coupled through a conductor to each of thet storage cores 14, 16 and 18 in the same word. If there were additional storage cores in that word, the loop would continue through those other additional cores. In a similar fashion, word-select cores 24, 26 and 28 are each coupled through conductors (not shown) to additional storage cores (not shown) by a closed conducting loop, each of which threads the storage cores pertaining to a particular word of storage. For example, the storage core 20 might correspond to bit number 3 of the word associated with word-select core 24.

A biasing current source 32 is connected to deliver current through all of the word-select cores. For example, it is shown causing a current to thread word-select cores 22, 24, 26 and 28. The bias current from source 32 would also be connected to all other word-select cores (not shown).

Each column set of word-select cores is adapted to be connected to a source of current which threads the cores to generate a magnetomotive force opposing the magnetomotive force generated by the bias current source 32. The column current source 34 is shown, in FIGURE 1, permanently wired into the circuit. However, in practice there would be only one column current source which would be connected into a matrix and adapted to be switched, for example, by transistor switches to cause current to flow through one column set at a time. Thus, the current from current source 34 is shown threading word-select cores 22 and 26. It also would thread additional word-select cores which are associated with that same column set.

Each row set of word-select cores is adapted to be switched to connect to a current source. The switching may be performed, for example, by means of transistor switches, and the like. In the circuit of FIGURE 1, the current sources 36 and 38, connected in parallel, are shown permanently wired to cause current to thread each of the word-select cores in a given row set. For example, the current sources 36 and 38 are shown permanently wired to thread cores 22 and 24 to generate magnetomotive force which opposes the magnetomotive force generated by the current flow from source 32. In practice, additional word-select cores would belong to the set which is made up of word-select cores 22 and 24.

It is again to be stressed that means (not shown) are provided alternatively, in accordance with computer instructions, to channel the current from sources 34, 36 and 38 into different rows and columns of word-select cores.

Figure 2:
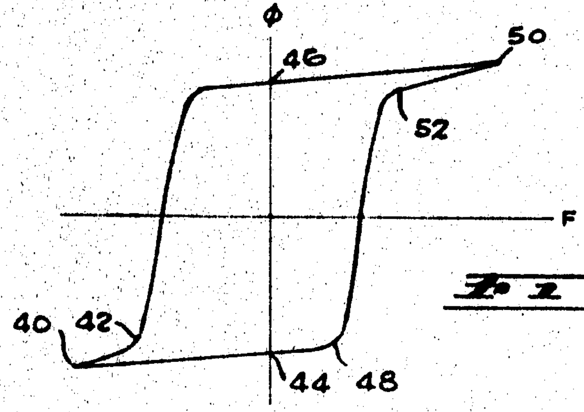
FIGURE 2 is a hysteresis loop demonstrating the change in magnetomotive force and flux in typical prior art devices.

In accordance with the prior art, only one current source would be provided in place of the two current sources 36 and 38 which make up a portion of this invention. The operation of the circuit of prior art devices is best explained in connection with FIGURES 2 and 3. In the prior art devices, the biasing current from source 32 establishes a magnetomotive force and flux represented by 40. The biasing magnetomotive force, for reasons presently to be explained, in prior art devices must be near the instep 42 of the hysteresis curve. It is necessary that the flux in the selected word-select core not be switched from one remanent flux state 44 to the other remanent flux state 46 by the existence of a magnetomotive force generated by a row current alone nor by the magnetomotive force generated by a column current alone. Thus, a row current or a column current alone may not generate a magnetomotive force in any core which, when combined with the magnetomotive force generated by the bias current, moves the total magnetomotive force in the coil beyond the switching threshold magnetomotive force at point 48. With the magnetomotive force generated by row currents and by column currents limited in amplitude, the maximum magnetomotive force, which occurs during the coincidence of both a row and column current, is limited in amplitude to a point 50. Because the point 50 is not far beyond the instep 52 of the hysteresis curve, the speed of flux change in the word-select core is relatively small and the envelope of current delivered to the storage cores of its associated word is represented by the curve 54 in FIGURE 3. It is to be noted that because the magnetomotive force at point 50 is relatively small, the width of the signal 54 is relatively large.

If a "1" is stored, for example, in storage core 18, the current flow through core 18, represented by curve 54, causes the core 18 to be switched from its remanent state which represents a "1" into its remanent state which represents a "0." The change of remanent states in storage core 18 generates a signal on the digit line which threads core 18. That signal is detected and used to set a register, such as a flip flop register, to prepare a current source to deliver current from member 30 back down the line connected to member 30, through core 18 to aid core 18 in changing its remanent state back toward a "1" remanent state. However, the current must not be sufficiently large to reset the storage cores which it threads except in conjunction with an additional aiding current 56 which is delivered from the word-select core, for example, 22.

If core 18 is in the remanent state corresponding to the storage of a "0," the transmission of current through core 18, as represented by curve 54, does not change the remanent state of core 18 and no signal appears upon its digit line. The register, such as a flip flop register, associated with that line then causes a current to flow, when a clock signal appears, to cause inhibiting current to flow in the line connetced to digit current source 30. The inhibiting current cannot be sufficiently large to cause the remanent state of other storage cores, such as core 20, to change, but only sufficiently large to oppose the magnetomotive force caused by current delivered from word-select core 22 during the reset portion of the cycle.

Figure 3:
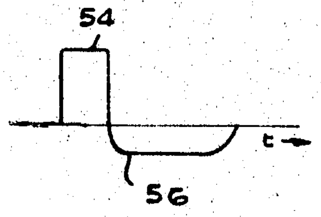
FIGURE 3 is a graph demonstrating the current flow generated by word-select cores in typical prior art devices.

In order for the inhibiting current from source 30 to prevent the changing of remanent states of storage core 18, the reset current, represented by 56 in FIGURE 3, is limited in amplitude. It may not be sufficiently large to change the remanent state of core 18 in the presence of the inhibiting current which, itself, is limited in amplitude. To prevent the amplitude of the current delivered by word-select core 22 during the reset portion of the cycle from being excessively large in amplitude, the magnetomotive force remaining in core 22 must be relatively small, as represented by point 40, although it must be beyond the instep 42 to cause the return to the initial remanent condition. It is the limitation on the amplitude of the current 56 that limits the maximum amount of magnetomotive force that may be generated by the biasing current source 32.

As the temperature of the word-select core increases, the position of the switching threshold magnetomotive force 48 moves toward point 44. Thus, if the magnetomotive force generated by the row currents and the column currents approach point 48, the prior art circuit becomes very temperature sensitive and switching of the word-select cores may occur with only a row current or only a column current, in addition to the biasing current applied to that particular core. This is undesirable and creates an unworkable circuit. Therefore, as a practical matter, the magnetomotive force generated by the bias current in combination with just a row current or just a column current may not approach too closely to point 48. This is a further limitation upon the amplitude of the maximum magnetomotive force which occurs at point 50.

Thus the prior art devices are rigidly limited in operation over very narrow ranges of the parameters of the magnetic cores. In those prior art devices, a significant time is used to read out the storage cores. Further, in those prior art devices the cores tend to be operated in a condition which causes the circuit to be extremely temperature sensitive.

Figure 4:
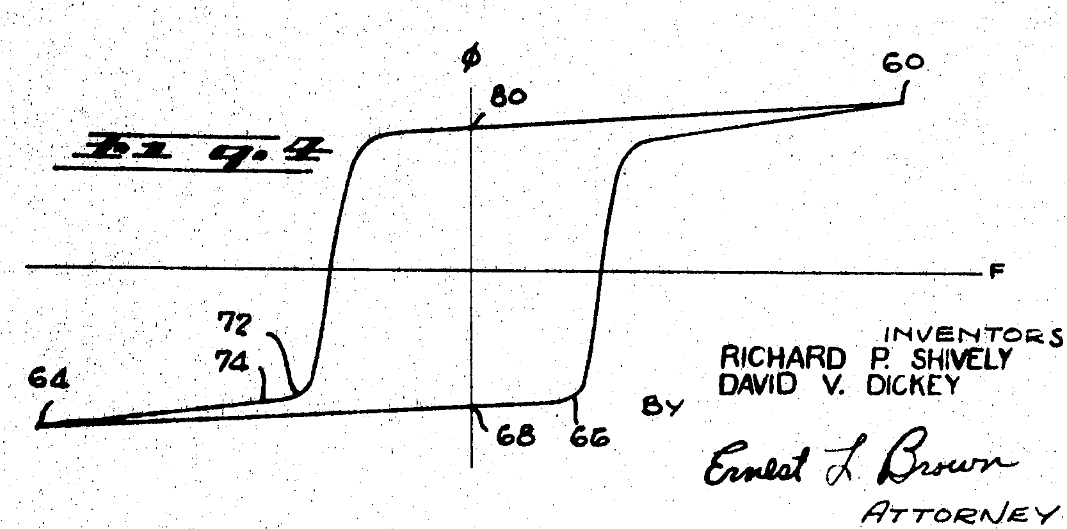
FIGURE 4 is a hysteresis loop showing the operation of a typical apparatus, made in accordance with the invention.

The operation of the device of this invention may best be explained by referring to FIGURES 4 and 9. Referring to FIGURE 4, in the device of this invention the maximum magnetomotive force 60 may be very large, as desired, to cause the current pulse delivered, for example, by word-select core 22 to storage cores 14, 16 and 18 to be very large and very short in duration as shown at 62 in FIGURE 9F. The biasing current flow from current source 32 causes a very large magnetomotive force to be produced in the word-select cores. For example, the biasing magnetomotive force at 64 may be of the order of four times the switching threshold magnetomotive force. The limit on the amount of current to be delivered by the current source 34 and by the sum of the currents from current sources 36 and 38 is determined by the amount of magnetomotive force, opposing the magnetomotive force generated by the current of current source 32, needed to change the net magnetomotive force to the switching threshold magnetomotive force 66. However, if the switching threshold magnetomotive force 66 is approached, the circuit becomes temperature sensitive. Therefore, it is a more practical arrangement to cause the magnetomotive force generated by current source 34 or by the sum of current sources 36 and 38 to be equal to the magnetomotive force generated by the current from current source 32 so that with only a row or column current present, the magnetomotive force becomes substantially zero as shown at 68. Notice that because the magnetomotive force represented by point 64 is very large, by making the magnetomotive force generated by a column current or the sum of a single set of row currents equal to the magnetomotive force generated by current source 32, that the magnetomotive force corresponding to point 60 may be moved as far as desired to the right in FIGURE 4. The only limitation on how far point 64 may be moved to the left is that on a "half select" signal, i.e. one involving only row or only column currents the change of flux must not be sufficiently large to cause a substantial current in the storage cores.

Should the word-select cores be arranged in a three dimensional matrix, all that would be necessary would be to move point 64 farther to the left so that the concurrence of only two switching currents in a word-select core would not move the magnetomotive force beyond point 66, and preferably not beyond point 68. It would require the concurrence of a row-current, a column current, and a stack current to move the applied magnetomotive force to point 60 to change the remanent state of the word-select core.

After the reading current pulse 62 occurs in, for example, core 18, it is desirable that a reset pulse 70 (FIG. 9F) be delivered to core 18. To limit the amplitude of pulse 70, when the magnetomotive forces are removed, the net resulting magnetomotive force must be in the region of the instep 72 of the hysteresis loop. Thus, for example, it may be moved to a point represented by 74. To remove only sufficient magnetomotive force to cause the operating point to switch from point 60 to point 74, the current of current source 34 and the current from current source 36 is removed. The current of current source 38 generates sufficient magnetomotive force in opposition to the magnetomotive force of the current from current source 32 to cause the operating point to be at point 74. At the end of the pulse 70, current source 38 ceases to deliver current and the operating point goes back to point 64.

Because the width of the pulse 62 is very narrow, in the interest of synchronizing the pulses of the system without relying upon the time constants of the system, it is preferable to have a short delay between the trailing edge of pulse 62 and the leading edge of pulse 70. This delay is shown at 76. Further, although all currents may be left on during the period 76, to do so is a waste of power. Therefore, it is desirable to remove the current from current source 34 at the end of pulse 62, namely at time 78. The removal of current from current source 34 causes the magnetomotive force in core 22 to move to a position which is shown by numeral 80. At the beginning of current pulse 70, the current from current source 36 is removed to cause the magnetomotive force operating point to move to point 74. At the end of pulse 70, the current from current source 38 is removed to cause the operating point to move to point 64.

If the word-select cores were arranged in a three dimensional matrix, a predetermined one of the row, column, or stack currents would be removed at time 78 to move the operating point to 80. A second predetermined one of the row, column, or stack currents would be removed in two steps to cause the operating point first to be moved to point 74. The remainder of the switching current would be removed at the end of pulse 70.

Referring to FIGURE 9, FIGURE 9A is a typical waveform of a clock pulse which is designed to control the flow of current in a current source 34. The waveform of FIGURE 9B is the waveform of a typical clock pulse designed to control the flow of current from current source 36. The waveform of FIGURE 9C is the waveform of a clock pulse which is designed to control the flow of current from current source 38. The waveform of FIGURE 9F is a waveform of current delivered by word-select core 22 to storage cores 14, 16 and 18.

If a storage core, such as core 18, is in its "1 state," a small current is generated due to the change of remanent states in core 18 induced by the flow of current 62, and that current, shown at 82 in FIGURE 9G, appears on the digit line of core 18 and is used, as described hereinafter, to set a register into its "1 state" to determine that an enhancing current 84 must flow in the digit line during the reset portion of the cycle.

If the storage core, for example core 18, is in its remanent state which corresponds to "0," the spike of current 62 through core 18 does not change the remanent state of core 18, and no current, as shown at 86 in FIGURE 9H, appears on the digit line. The register, as explained hereinafter, is in its "0 state" which causes an inhibiting current 88 to flow in the digit line through core 18 to prevent core 18 from being set into a "1 state." The flow of enhancing current 84 or inhibiting current 88 is controlled by a digit clock, the waveforms of which are shown at 90 in FIGURE 9D.

Figure 5:
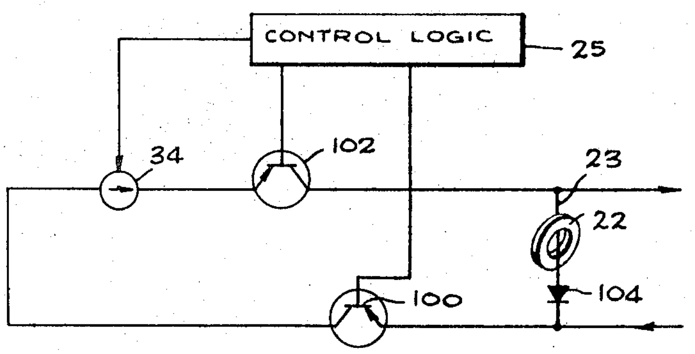
FIGURE 5 is a schematic diagram of a typical circuit used for switching current selectively through different word-select cores.

In FIGURE 5 is shown a partial schematic of a typical scheme for connecting a current source such as current source 34 into a particular column conductor, or for connecting current sources such as 36 and 38 into particular row conductors. A current source 34 is controlled from the computer to generate a particular current pulse at a particular time. Connected between the current source 34 and a switch core such as switch core 22, is a pair of switches such as transistors 100 and 102, and an isolating diode 104. There is, in general, one isolating diode such as diode 104 for each row and each column of word-select cores. The number of transistors such as transistors 100 and 102 are equal in number to twice the square root of the number of word-select cores. Of course, there must be a whole number of such transistors. For example, if there are four word-select cores, the number of transistors needed would be four; if there are nine word-select cores, the number of transistors needed are six; and if the number of word-select cores is sixty-four, the number of transistors needed would be sixteen. To cause the particular line 23 to be energized, the control logic 24 of the computer would need to cause both transistors 100 and 102 to conduct.

Figure 6:
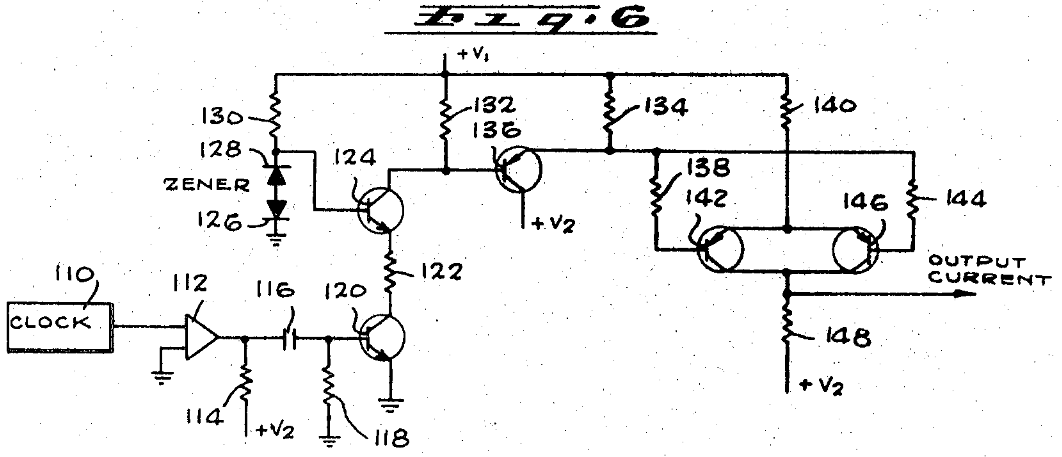
FIGURE 6 is a schematic diagram of a typical current source adapted to excite word-select cores in this invention.

A typical constant current source is shown in FIGURE 6. The current source of FIGURE 6 may be, for example, any of the current sources 32, 34, 36 or 38. The clock 110 may, then, be the Y clock having the output signal 61, the $X_1$ having the output signal 77, or the $X_2$ having the output signal 71, as shown in FIGURES 9A, 9B and 9C. When used as the current source 32, no clock is needed because the current source is constant. The output signal of the clock 110 is connected through an amplifier 112, and a coupling network of resistors 114 and 118 and series capacitor 116 to the base of a transistor 120. The resistors 114 and 118 are connected to a source of potential $V_2$ and the ground potential, respectively, to place the proper operating potentials on the output stage of amplifier 112 and the base of transistor 120. Condenser 116 is an isolating capacitor and is sufficiently large to conduct the clock signals. The emitter of the transistor 120 is connected to the common or ground terminal. The collector of transistor 120 is connected through a current limiting resistor 122 to the emitter of transistor 124. The base of transistor 124 is connected through a series connection of a Zener diode 128 and a diode 126 to the ground terminal. The Zener diode is adapted to maintain the base of transistor 124 substantially at a constant potential with respect to the ground terminal. The diode 126 is inserted to compensate for the voltage drop between the base and emitter of transistor 124. The base of transistor 124 is connected through a current limiting resistor 130 to a source of potential $V_1$. The collector of transistor 124 is connected through a load resistor 132 to the source of potential $V_1$ and is also connected to the base of transistor 136. The collector of transistor 136 is connected to a source of potential $V_2$. The emitter of transistor 136 is connected through a load resistor 134 to the source of potential $V_1$. The emitter of transistor 136 is connected through resistors 138 and 144 to the bases of transistors 142 and 146 whose output collectors are connected together and comprise the output terminal of the current source. The collectors of transistors 142 and 146 are connected through load resistor 148 to a source of voltage $V_2$. The emitters of transistors 142 and 146 are connected together and, through a resistor 140, to a source of voltage $V_1$.

The presence of a signal at the output of clock 110 causes transistor 120 to conduct into saturation. Transistor 124 now conducts and the voltage across 122 becomes equal to the voltage across Zener diode 128 plus the voltage across diode 126 minus the base-to-emitter voltage of transistor 124 minus the collector-to-emitter voltage of transistor 120. Thus the voltage across resistor 122 is substantially equal to the voltage across Zener diode 128. The base of transistor 124 is maintained substantially at a constant voltage with respect to ground, whereby the current flow through resistor 122 is substantially constant during the period of the clock pulse. The emitter to collector current of transistor 136 follows the collector to emitter current flow of transistor 124, hence is substantially constant during the period of the clock pulse. The power amplifiers, transistors 142 and 146 are coupled to the output of transistor 136, whereby the emitter to collector current flow, and hence the output current of the current source is maintained substantially constant.

Figure 7:
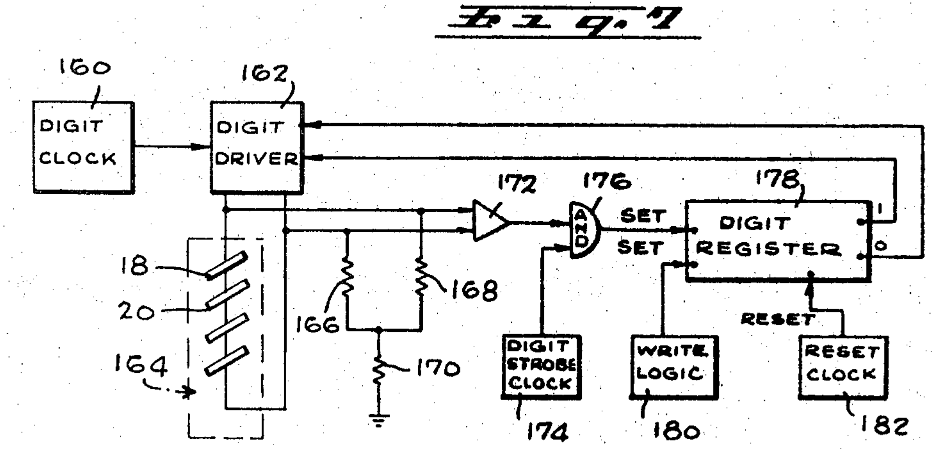
FIGURE 7 is a block diagram showing the bit-sensing circuit and the digit driver connection to the storage cores in a typical circuit used in this invention.

A typical digit driving and sensing circuit 30 is shown in FIGURE 7. A plurality of storage cores 164, corresponding to the same bit number of all of the words of the storage cores, has a sensing line and digit driving line connected therethrough which is terminated, typically, in a terminating impedance represented by resistors 166, 168 and 170. The shown digit line is connected to the input of a sensing amplifier 172 which is adapted to amplify the sensed current on the particular digit line. The output of amplifier 172 is connected to one input of an AND gate 176. Also connected to AND gate 176 is a digit strobe clock 174 which has an output waveform as shown at 61 in FIGURE 9A. The purpose of using an AND gate with a digit strobe clock is to cause the line to be sensed only at a particular time during the read portion of the cycle. The output of AND gate 176 is connected to a SET input of a digit register 178 which may be made of a plurality of flip flops. Each bit of storage is adapted to be connected to a different flip flop of the digit register 178. The write logic of the computer corresponding to that particular bit, 180, is connected to a SET input of the digit register 178, and is used when it is desired to set a "1" or a "0" into storage. A reset clock 182 is connected to a RESET terminal of the digit register 178. The output of the digit register 178 is connected to a digit driver 162 which is adapted to deliver enhancing or inhibiting current to storage cores 164. When a "1" is sensed at the SET input of the digit register 178, the digit register is set into its "1" state which causes the digit driver to deliver enhancing current to the storage cores 164. Failure of the digit register to receive a SET pulse causes the digit register to remain in its "0" state, which causes the digit driver to deliver an inhibiting pulse upon command from the digit clock 160.

A typical digit driver 162 is shown in FIGURE 8. Referring to FIGURE 8, consider enhancing current to flow from left to right and inhibiting current to flow from right through the storage cores 164. With that restraint, the "1" output of the digit register 178 (FIG. 7) would be connected to the inputs of AND gates 200 and 240 while the zero output of register 178 would be connected to the inputs of AND gates 218 and 248. The output of AND gate 200 is connected through a resistor 202 to the emitter of transistor 204. The base of transistor 204 is connected to a positive terminal of a voltage source +V. The collector of transistor 204 is connected through a coupling resistor 206 to the base of transistor 214 and through a load resistor 208 to a voltage source +V. The output of AND gate 248 is connected through a coupling resistor 246 to the emitter of transistor 244. The base of transistor 244 is connected to the positive terminal of voltage source +V. The collector of transistor 244 is connected through a coupling resistor 242 to the base of transistor 216 and through a load resistor 212 to a voltage source +V. The emitters of transistors 214 and 216 are connected together, through a load resistor 210, to a voltage source V. The collectors of transistors 214 and 216 are connected to opposite ends of the storage core stack 164. The output of transistor 218 is connected through a coupling resistor 220 to the base of transistor 222. The emitter of transistor 222 is connected through a load resistor 224 to a source of voltage +V. The collector of transistor 222 is connected through a load resistor 226 to a source of voltage −V, and to the base of transistor 228. The collector of transistor 228 is connected to the collector of transistor 214. The output of gate 240 is connected through a coupling resistor 238 to the base of transistor 234. The emitter of transistor 234 is connected through a load resistor 236 to a source of voltage +V. The collector of transistor 234 is connected through a resistor 232 to a source of voltage −V, and to the base of transistor 230. The collector of transistor 230 is connected to the collector of transistor 216. The emitters of transistors 228 and 230 are connected together to the ground terminal.

When the digit register 178 (FIG. 7) is set into its one state, gates 200 and 240 conduct upon the application of a pulse from digit clock 160. The signals at the outputs of gates 200 and 240 cause transistors 204 and 234 to conduct. The conduction of transistors 204 and 234 modifies the voltage on the bases of transistors 214 and 230 causing a current to flow from the voltage source +V, through resistor 210, through the emitter to collector path of transistor 214, from left to right through memory core stack 164, from the collector to emitter of transistor 230 to the ground terminal.

When the digit register 178 is reset into its zero state, upon application of a pulse by digit clock 160, gates 218 and 248 conduct. The conduction of gates 218 and 248 cause transistors 222 and 244 to conduct. The conduction of transistors 222 and 244 modify the voltages on the bases of transistors 228 and 216 causing them to conduct and current to flow from the positive voltage source +V, through resistor 210, the emitter to collector path of transistor 216, through the memory core stack 164 from right to left, and through the collector to emitter path of transistor 228 to the ground terminal.

Referring again to FIGURE 9, the Y, $X_1$ and $X_2$ clocks, whose signals are shown at 61, 77 and 71 of FIGURES 9A, 9B and 9C, cause the Y, $X_1$, and $X_2$ current sources to conduct and move the operating magnetomotive force and flux in word-select core to point 60. Simultaneously, the digit strobe clock 174 opens gate 176 allowing the signal 82 of FIGURE 9G to set the digit register 178 if that signal is present. The signal 82 will be present if the particular storage core to which the digit sensing amplifier 172 is connected, is set in its one state. Immediately thereafter, at time 78, as represented in FIGURE 9F, the digit strobe clock and the Y clock signals are removed. This closes the gate 176 and moves the operating point of the word-select core 22 to point 80. After a short delay, the $X_1$ clock signal 77 of FIGURE 9B is removed which causes the operating point of the word-select core 22 to be moved to point 74, generating the current signal which is shown at 70 in FIGURE 9F. If a signal 82 had been sensed to cause the digit register 178 to be set into its one position, the digit driver 162 would cause a current 84 to be sent through storage core 18 to enhance the effect of the current 70 to cause the storage core 18 to be reset into its one state. In the event that the storage core was in its zero state at the time of interrogation, the signal will be as shown at 86, and the digit register 178 having been reset by signal 183 at the end of the prior cycle, the inhibit current 88 will be sent down the digit line to oppose the effect of the current 70. At the end of the reset portion, $X_2$ clock 71 and digit strobe clock 90 return to zero. Shortly thereafter, the digit register reset clock 183 resets the digit register 178 to zero.

Thus, the device of this invention uses word-select cores in a manner and with current driving apparatus which causes the total read and reset cycle time of the storage cores to be reduced substantially, and which causes the readout signal from the storage cores to be enhanced. Further, because of the fact that the device of this invention need not be designed to cause half select currents to approach the switching threshold magnetomotive force, the word-select cores and the operation of their matrix and the associated storage matrix is not temperature sensitive.

Although the device of this invention has been described in great detail above, it is not intended that the invention should be limited by that description, but only in accordance with the spirit and scope of the appended claims.

We claim:

1. A memory device for cyclically reading out and storing information during alternating read and write periods respectively, said device comprising:

at least one ferromagnetic switching core;

at least one ferromagnetic storage core;

means for cyclically switching the flux of said switching core between predetermined first and second remanent states, said last named means including first means for continuously applying biasing magnetomotive force of a predetermined magnitude to said switching core to bias the flux of said core into a predetermined first remanent state, second means for applying switching magnetomotive force to said core in opposition to said biasing magnetomotive force to switch the flux of said core into the second predetermined remanent state, and third means for removing a portion of said switching magnetomotive force to cause the resulting magnetomotive force applied to said switching core to be substantially less in magnitude than the magnitude of said biasing magnetomotive force, but of sufficient magnitude to switch the flux of said switching core into the first remanent state;

means for coupling said switching core to said storage core to cause the magnetomotive force applied to said storage core to change when the flux in said switching core changes;

reading means for sensing changes in the remanent states of said storage core during each change of said switching core from the first to the second remanent state; and writing means for selectively enhancing and inhibiting changes in the remanent state of said storage core during each change of said switching core from the second to the first remanent state.

2. A device as recited in claim 1 in which:

said first means for applying biasing magnetomotive force comprises a biasing current source coupled to said switching core;

said second means for applying switching magnetomotive force comprises switching current means, coupled to said switching core for generating during each of said read periods magnetomotive force in opposition to the magnetomotive force generated by said biasing current source;

and said third means for removing a portion of said switching magnetomotive force comprises means for reducing the current delivered by said switching current means during each of said writing periods.

3. A device as recited in claim 1 in which:

said first means for applying biasing magnetomotive force comprises a biasing current source coupled to said switching core;

said second means for applying switching magnetomotive force comprises a plurality of switching current means, each coupled to said switching core, for generating magnetomotive force during each of said read periods in opposition to the magnetomotive force generated by said biasing current means;

and said third means for removing a portion of said switching magnetomotive force comprises means for reducing the amplitude of the current of at least one of said switching current means during each of said writing periods.

4. A device as recited in claim 1 in which said third means includes means for reducing the magnitude of the magnetomotive force applied to said switching core, when said switching core is switched back into said first remanent state, to a magnitude substantially equal to the magnitude of the magnetomotive force at the instep of the major switching hysteresis curve of said core.

5. A device as recited in claim 1 in which said third means includes means for adjusting the magnetomotive force applied to said switching core, each time said core is switched back into said first remanent state, to a predetermined magnitude so as to control the speed of change of flux in said core from said second to said first remanent state.

6. A device as recited in claim 1 in which said third means includes means for adjusting the magnetomotive force applied to said switching core so that the speed of change of flux from said first to said second remanent state is substantially greater than the speed of change of flux from said second to said first remanent state; thereby coupling to said storage core a high-level read pulse during the transition from the first to the second remanent state, and a write pulse of sufficiently low-level to avoid switching said storage core in the absence of an enhancing signal supplied by said writing means during the transition back to the first remanent state.

7. A device as recited in claim 2 in which said third means includes means for adjusting the magnetomotive force applied to said switching core so that the speed of change of flux from said first to said second remanent state is substantially greater than the speed of change of flux from said second to said first remanent state; thereby coupling to said storage core a high-level read pulse during the transition from the first to the second remanent state, and a write pulse of sufficiently low-level to avoid switching said storage core in the absence of an enhancing signal supplied by said writing means during the transition back to the first remanent state.

8. A device as recited in claim 3 in which said third means includes means for adjusting the magnetomotive force applied to said switching core so that the speed of change of flux from said first to said second remanent state is substantially greater than the speed of change of flux from said second to said first remanent state; thereby coupling to said storage core a high-level read pulse during the transition from the first to the second remanent state, and a write pulse of sufficiently low-level to avoid switching said storage core in the absence of an enhancing signal supplied by said writing means during the transition back to the first remanent state.

9. A device as recited in claim 3 in which said third means includes means for removing a portion of the applied switching magnetomotive force, insufficient to change remanent states of said core, prior to the removal of the portion of said magnetomotive force which causes a change from said second to said first remanent state.

10. A device as recited in claim 3 in which the maximum applied magnetomotive force when said core is switched from said first to said second remanent state is adjusted to cause the flux in said core to be changed at a predetermined rate from said first to said second remanent state;

in which the sum of the magnetomotive forces applied by said switching current means, in the absence of current from one said current means, is insufficient to cause said flux to switch from said first to said second remanent state;

and in which at least one of said switching current means is adapted to have its current removed in two steps.

11. A device as recited in claim 10 and further comprising means for removing a portion of the magnetomotive force at a time prior to the change of remanent states from said second to said first remanent state, and last named removal of magnetomotive force being insufficient to cause said change of remanent state.

12. A device as recited in claim 1 and further comprising:

a plurality of ferromagnetic storage cores;

means for coupling said switching core to said plurality of storage cores to cause the magnetomotive force applied to said storage cores to change when said flux in said switching core changes from one remanent state to the other remanent state;

and each of said storage cores is coupled to reading means for sensing changes in remanent state of said corresponding storage cores.

13. A device as recited in claim 12 in which each of said storage cores is coupled to writing means for selectively enhancing and inhibiting changes in the remanent state of said corresponding storage core when said switching core changes from said second to said first remanent state.

14. A device as recited in claim 13 in which each of said storage cores is coupled to writing means for selectively enhancing and inhibiting changes in the remanent state of said corresponding storage core; and said writing means is connected to be responsive to signals sensed by said reading means to aid in resetting said storage core to restore the readout information.

15. A device as recited in claim 14 in which each of said storage cores has a separate reading means for sensing changes in remanent state thereof, and each of said storage cores has writing means for selectively enhancing and inhibiting changes in the remanent state thereof, said reading means being connected to control said writing means to cause information readout of said storage cores to be re-entered therein.

16. A memory device for cyclically reading out and storing information during alternate read and write periods respectively, said device comprising:

a first plurality of ferromagnetic storage cores, arranged in word-sets, each corresponding to a word of storage, and arranged in bit-sets, each of said bit-sets comprising one and only one member from each of said word-sets, each of said word-sets comprising one and only one member of each of said bit-sets;

a second plurality of ferromagnetic word-select cores each associated with a different word-set of said storage cores;

means for electromagnetically coupling said word-select cores each to its associated word-set of said storage cores to cause the magnetomotive force applied to said storage cores to change when the flux changes in said associated word-select cores;

a plurality of digit drivers and sensors, equal in number to said bit-sets of storage cores, and each associated with a separate said bit-set;

means for electromagnetically coupling each said bit-set of storage cores to its said associated sensor to cause the stored information to be read out of said storage cores whenever a read pulse is received from said word-select cores;

means for electromagnetically coupling each said bit-set of storage cores to its said associated digit driver to cause enhancing and inhibiting current to be coupled to said storage cores to enhance or inhibit the magnetomotive force during resetting of said storage cores during the write period of operation;

magnetomotive biasing means for biasing said word-select cores into a first remanent state;

switching magnetomotive means for selectively generating switching magnetomotive force in each of said word-select cores, in opposition to the magnetomotive force created by said biasing magnetomotive means, to cause the flux in a selected word-select core to be changed, at a predetermined rate, into a second remanent state, thereby coupling a read pulse to a selected word-set of storage cores;

and means for removing said switching magnetomotive force in at least two-time separated steps to limit the rate of flux change from said second to said first remanent state, thereby limiting the reset current delivered to the said associated word-set of storage cores, during said write period of operation.

17. A device as recited in claim 16 further comprising means for adjusting the rate of change of flux during the change of said selected word-select core from its first to its second remanent state so that the rate of change is substantially greater than the rate of change of flux in the same word-select core during its change from said second to said first remanent state; thereby coupling to said associated word-set of storage cores a high-level read pulse during the transition from the first to the second remanent state, and reset current of sufficient low-level to avoid switching said associated word-set of storage cores, in the absence of an enhancing signal supplied by the associated digit driver, during the transition back to the first remanent state.

18. A device as recited in claim 17 in which said means for removing said switch magnetomotive force is adapted to remove said magnetomotive force in at least three time-separated steps, first in sequence to reduce the applied magnetomotive force without changing the flux from its second to its first state, then in sequence to reduce the applied switching magnetomotive force to cause the flux in said selected word-select core to change from said second to said first remanent state, then in sequence to remove the remaining said switching magnetomotive force.

19. A device as recited in claim 18 in which said magnetomotive forces are generated by current sources and means for coupling said current sources to said word-select cores.

20. A device as recited in claim 19 and further comprising:

a storage register, connected to receive signals from said digit drivers and sensors, and adapted to control the enhancing and inhibiting current of said digit drivers and sensors.

21. A device as recited in claim 16 in which:

said magnetomotive forces are generated by current sources and means for coupling said sources to said word-select cores.

22. A device as recited in claim 16 in which:

said word-select cores are arranged in row-sets and column sets, each of said row-sets comprising one and only one member from each of said column-sets, each of said column-sets comprising one and only one member of each of said row-sets;

said magnetomotive biasing means comprises a biasing current source, and means for conducting current from said source through all of said word-select cores;

said switching magnetomotive means comprises a row current source, a column current source, a plurality of row conductors each threading a different row-set of said word-select cores, a plurality of column conductors each threading a separate column-set of said word-select cores, first switching means connected between said row current source and said row conductors selectively to direct current into one of said row conductors to apply magnetomotive force to the row-set associated with that selected row conductor in opposition to the magnetomotive force generated by said biasing magnetomotive means, and second switching means connected between said column current source and said column conductors selectively to direct current from said column source to one of said column conductors to generate magnetomotive force in the column-set associated with that selected column conductor in opposition to the magnetomotive force generated by said biasing magnetomotive means.

23. A device as recited in claim 22 in which:

said means for removing said switching magnetomotive force comprises means for removing switching current in at least two time-separated steps.

24. A device as recited in claim 23 in which:

the current from one of said current sources, chosen from the group consisting of said row-current source and said column-current source, is first removed, a portion of the other current source of said group is next removed, then the remainder of the current from said other current source of said group is removed.

References Cited

UNITED STATES PATENTS

| | | | |
|---|---|---|---|
| 2,691,155 | 10/1954 | Rosenberg et al. | 340—174 |
| 3,244,902 | 4/1966 | King et al. | 307—88 |
| 3,287,710 | 11/1966 | Snyder | 340—174 |
| 3,341,830 | 9/1967 | Conrath | 340—174 |
| 3,388,387 | 6/1968 | Webb | 340—174 |

BERNARD KONICK, Primary Examiner

G. M. HOFFMAN, Assistant Examiner